(12) United States Patent
Marquis

(10) Patent No.: US 12,038,241 B2
(45) Date of Patent: Jul. 16, 2024

(54) LAYERED RADIATOR FOR EFFICIENT HEAT REJECTION

(71) Applicant: Kyle Borden Marquis, San Jose, CA (US)

(72) Inventor: Kyle Borden Marquis, San Jose, CA (US)

(*) Notice: Subject to any disclaimer, the term of this patent is extended or adjusted under 35 U.S.C. 154(b) by 0 days.

(21) Appl. No.: 17/385,920

(22) Filed: Jul. 27, 2021

(65) Prior Publication Data

US 2022/0034607 A1 Feb. 3, 2022

Related U.S. Application Data

(60) Provisional application No. 63/057,712, filed on Jul. 28, 2020.

(51) Int. Cl.
*F28F 21/02* (2006.01)
*B64G 1/50* (2006.01)
*F28F 13/00* (2006.01)

(52) U.S. Cl.
CPC .............. *F28F 21/02* (2013.01); *B64G 1/503* (2013.01); *F28F 2013/001* (2013.01); *F28F 2275/025* (2013.01); *F28F 2275/08* (2013.01)

(58) Field of Classification Search
CPC .... B64G 1/503; F28F 21/02; F28F 2013/001; F28F 2275/025; F28F 2275/08
USPC ........................................................ 165/185
See application file for complete search history.

(56) References Cited

U.S. PATENT DOCUMENTS

| 4,133,376 A * | 1/1979 | Eilenberg | F28D 15/0266 165/135 |
| 5,069,274 A * | 12/1991 | Haslett | B64G 1/503 165/274 |
| 6,776,220 B1 * | 8/2004 | Low | B64G 1/50 165/41 |
| 6,883,592 B2 * | 4/2005 | Lee | H01L 23/3677 257/E23.105 |
| 7,040,388 B1 * | 5/2006 | Sato | H01L 23/3677 257/722 |
| 7,215,545 B1 * | 5/2007 | Moghaddam | H01L 23/3732 361/708 |
| 7,256,996 B2 * | 8/2007 | Egbert | H05K 7/20154 165/185 |
| 7,321,494 B2 * | 1/2008 | Han | H01L 23/427 165/185 |

(Continued)

OTHER PUBLICATIONS

Haller, H. C., Wesling, G. C., Lieblein, S., Heat-Rejection and Weight Characteristics of Fin-Tube Space radiators with Tapered Fins. Technical Note. 1964, relevant pp. 1-4 & 19-20. National Aeronautics and Space Administration, TN D-2168. Washington D.C.

(Continued)

*Primary Examiner* — Raheena R Malik
(74) *Attorney, Agent, or Firm* — Larsen IP, PLLC

(57) ABSTRACT

A radiator which rejects heat to its surrounding environment through radiation, comprising layers of thermally conductive material in a tapered geometry. As well, a radiator which incorporates structural support to maintain rigidity in the out-of-plane directions for its thermally conductive layers. The radiator is used by incorporating a source of heat to the layers, having a lower temperature in the surrounding environment, and structurally attaching to an assigned location.

15 Claims, 3 Drawing Sheets

(56) References Cited

U.S. PATENT DOCUMENTS

| | | | |
|---|---|---|---|
| 7,430,121 B2 * | 9/2008 | Lu | H01L 23/4093 361/717 |
| 7,509,997 B2 * | 3/2009 | Lin | H01L 23/467 165/104.34 |
| 7,564,689 B1 * | 7/2009 | Guo | H01L 23/4093 165/185 |
| 7,889,503 B2 * | 2/2011 | Nagareda | H01L 23/467 174/16.3 |
| 7,929,309 B2 * | 4/2011 | Zhao | H01L 23/4093 165/185 |
| 7,969,742 B2 * | 6/2011 | Liu | H01L 23/4006 257/713 |
| 8,077,465 B2 * | 12/2011 | Chang | H01L 23/40 24/453 |
| 8,081,470 B2 * | 12/2011 | Oki | G02B 6/4201 165/185 |
| 8,081,477 B2 * | 12/2011 | Yang | H01L 23/4093 361/720 |
| 8,087,456 B2 * | 1/2012 | Wei | H01L 23/3672 165/185 |
| 8,157,217 B1 * | 4/2012 | Anderson | B64G 1/503 244/171.8 |
| 8,230,910 B2 * | 7/2012 | Bielesch | F04D 25/06 165/122 |
| 10,101,099 B2 * | 10/2018 | Benthem | B64G 1/58 |
| 11,333,445 B1 * | 5/2022 | Milkie | B64G 1/50 |
| 2011/0277959 A1 * | 11/2011 | Morin | B23P 15/26 165/104.11 |
| 2019/0331437 A1 * | 10/2019 | Jinnoh | F28F 13/00 |
| 2022/0034607 A1 * | 2/2022 | Marquis | F28F 1/20 |

OTHER PUBLICATIONS

Kraus, A. D., Aziz, A., and Welty, J., Extended Surface Heat Transfer, book, 2001, Chap. 13, relevant pp. 572-578 & 595 & 609. Wiley.

Marquis, K. B., A Novel Deployable Radiator Architecture for High-Power Spacecraft Missions by Connecting Tapered and Layered Panels with Thin Kinked Tubes, master's thesis, 2021, relevant pp. 1-32, University of Colorado Boulder. ProQuest Dissertations Publishing.

Van Lierop, C. A. B., Deployable radiator wing for high performance CubeSats, master's thesis, 2021, relevant pp. 11-25 & 43-44, Delft University of Technology, Netherlands.

Maas, A., Development of Pyrolytic Graphite Applications in Spacecraft Thermal Control Systems. 47th International Conference on Environmental Systems, 2017, relevant pp. 1-6 & 13-14, Charleston, SC.

* cited by examiner

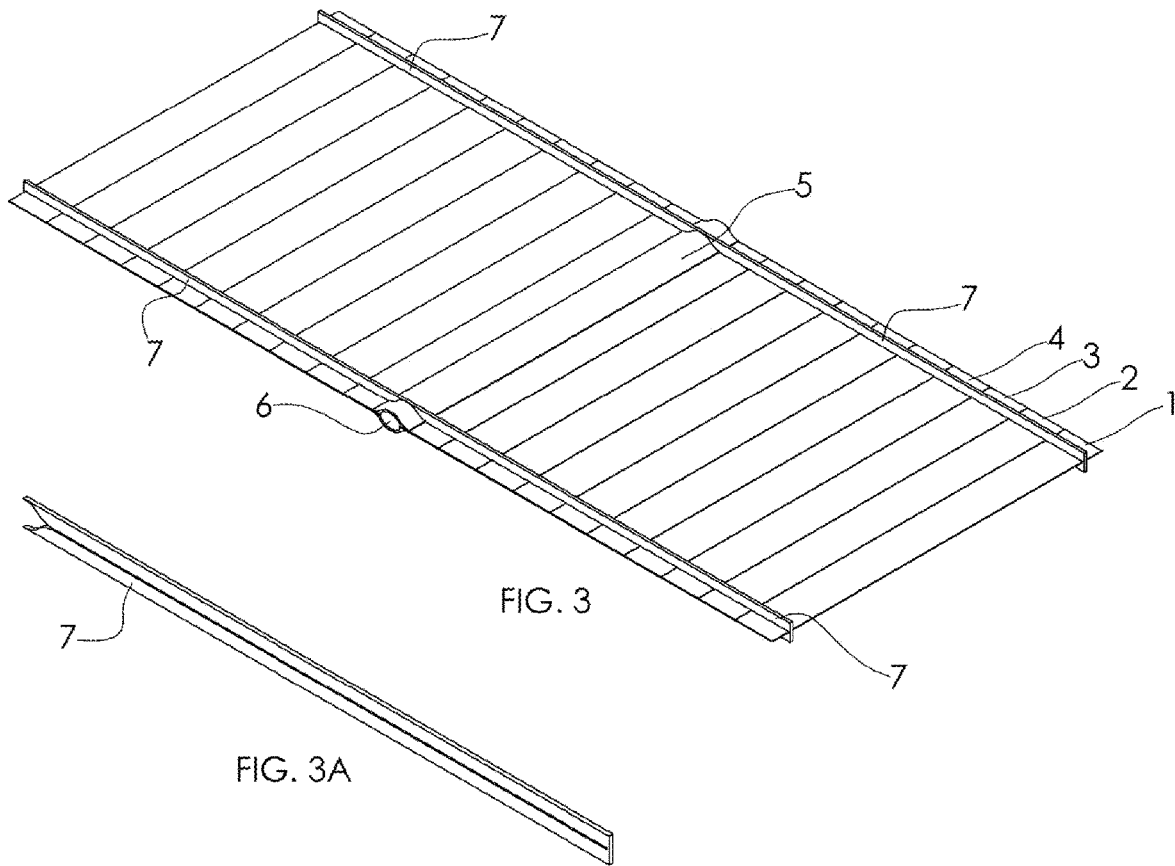
FIG. 3
FIG. 3A
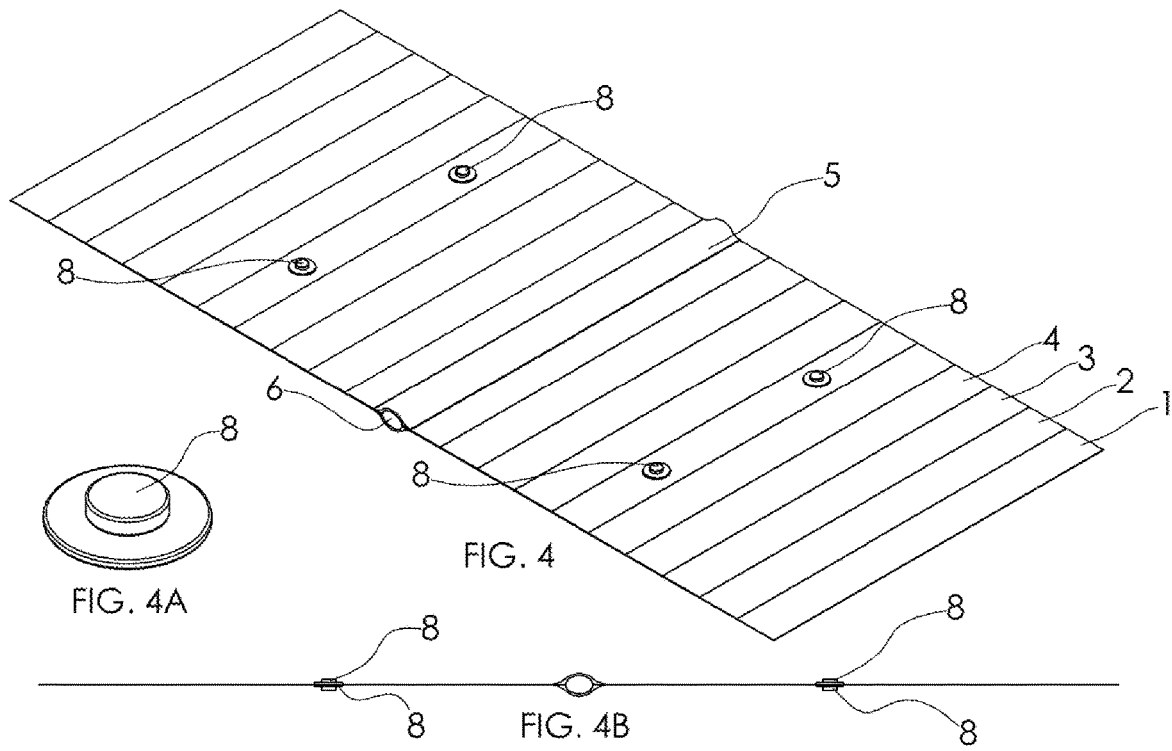
FIG. 4
FIG. 4A
FIG. 4B

LAYERED RADIATOR FOR EFFICIENT HEAT REJECTION

CROSS-REFERENCE TO RELATED APPLICATIONS

This application claims the benefit of provisional patent application Ser. No. 63/057,712, filed 2020 Aug. 28 by the present inventor.

BACKGROUND

The following is a tabulation of some prior art that presently appears relevant:

U.S. Patents

| U.S. Pat. No. | Kind Code | Issue Date | Patentee |
|---|---|---|---|
| 10,101,099 | B2 | Oct. 16, 2018 | Bruin Benthem |
| 4,133,376 | | Jan. 9, 1979 | Stanton L. Eilenberg |

NONPATENT LITERATURE DOCUMENTS

Haller, H. C., Wesling, G. C., Lieblein, S., *National Aeronautics and Space Administration* "Heat-Rejection and Weight Characteristics of Fin-Tube Space radiators with Tapered Fins", TND-2168

This patent relates to radiators which transfer heat to the surrounding environment through the process of radiation. For example, this is the type of radiator which spacecraft use to reject heat. It is worth noting, however, that this design need not be limited to spacecraft applications; other applications might include removing heat from plants that generate or transfer power for terrestrial or interplanetary purposes. Here, heat rejection is defined as the process of disposing of acquired energy, or "waste heat," to maintain systems within the required temperature limits for operation.

Radiators are commonly made from sandwich panels consisting of top and bottom skin layers, as well as support material in the center. This approach keeps the structure rigid while being lightweight, since the skin layers are far apart, thus increasing the 'area moment of inertia' and reducing bending motion. Radiators will commonly have tubes or pipes running inside the structure delivering heat from the surface exposed to the surrounding environment. These radiators are not optimized to deliver the most amount of heat per unit mass and can become heavy. For certain applications, such as spacecraft, it can be difficult to launch mass into orbit or further out into the solar system. Accordingly, there is a need to develop lighter and higher heat rejection capabilities to reduce the mass of spacecraft.

In recent years there have been calls for spacecraft that have large heat rejection capabilities that minimize mass. As technology enables more powerful computing and smaller sensors, spacecraft have become more and more compact and consequently power dense. Without an ability to remove this power generated onboard, such a spacecraft would increase in temperature until a new thermal equilibrium is reached. The issue is that sensors and equipment cannot necessarily perform at these higher temperatures, so spacecraft designers need ways to get rid of this heat without having significant temperatures within the spacecraft.

Common radiators use aluminum as the material transferring heat to a surface, often with a coating to improve emissivity and add the ability for a surface to admit rather than reflect radiation. By using pyrolytic graphite layers, the thermal conductivity can reach up to 1950 watts per meter kelvin whereas aluminum might reach 230 watts per meter kelvin. By having a large thermal conductivity, a radiator provides less resistance for heat to flow, allowing for higher performance of heat rejection per unit mass. Furthermore, graphite is less dense than aluminum, enabling a lighter radiator as well.

Heat pipes, heat straps, and pumped fluid loops are all used to transfer heat to a radiator on a spacecraft, but for the purposes of this design, what matters is that there is some means of delivering heat to the radiator, hereby referred to as the source of heat.

There has been a lack of research into how best to utilize these layers for the most efficient heat transfer per unit mass. Solid rectangular profiles, as evidenced by the current technology sandwich panels, do achieve good heat rejection abilities. However, the additional mass at the section furthest from the source of heat is not providing the same usefulness as the mass that is closest to the heat source. This is because as heat travels away from its source, it reduces in temperature through conductive resistance. Since heating from radiation depends proportionally to the temperature of the section of surface to the power of 4, a small reduction in temperature can lead to significantly less radiative heat transfer leaving that section. Consequently, as the radiator material gets further from the source, its ability to reject heat lowers, reducing the efficiency of heat per unit mass of the system. However, the concept of tapering a heat transfer device has significant history in the field of heat sinks and fin design; heat transfer textbooks go into detail for this topic. For radiators, however, there is little research. One tapered radiator design has been considered in the past by Haller, et al. at NASA in 1964 with their technical note TN D-2168. However, their work is limited to solid radiators, not one which includes layers, such as high performing graphite sheets whose existence dates to the early 2000s as graphene was being commercially developed.

Layered radiators have only been found in recent literature. In a patent filed in 2015 (U.S. Pat. No. 10,101,099 B2), a radiator was conceived of which utilized layers of pyrolytic graphite to transfer heat away from a source. This work shows a configuration consisting of conductive and emissive layers, albeit not with an optimal configuration: one which forgoes ineffective mass using tapered geometry.

U.S. Pat. No. 4,133,376 shows a layered multi-stage radiator system, but specifies that it needs to contain heat pipes, thermal insulation in between layers, and at least 2 spaced apart radiator elements. This insulation and spacing reduces the thermal performance of a radiator design. Furthermore, separate sources of heat connected to each successive radiator element as shown in this work is going to introduce additional unwanted mass in the system.

SUMMARY

An improved radiator design tapers, making it thinner the further out it is from the source of heat thereby removing ineffective mass. This is analogous to tapered fins for lightweight cooling fins for computers, where convection is the process of rejecting heat instead of radiation. This radiator should be made from layers of material with a high thermal conductivity to achieve large heat rejection. Any taper could be used that generally shrinks in thickness the further out the radiator gets from the source. Here, an example of a symmetric linear profile is depicted in the drawings. Layers of conductive material are used whether it is graphite, graphene, or some other material, may be aluminum, carbon fibers, etc.

A tapered radiator is used to reduce mass in the design. By removing the mass furthest from the source of heat, this reduces a significant amount of mass, while leaving the thermal performance relatively similar. Towards the base (closest part of the layers to the source of heat), all the heat leaving the entire surface must flow through the layers' cross-sectional area, whereas towards the thinner sections (further from the source of heat), only the heat leaving the thinner sections must pass through the layers' cross-sectional area. Put another way, more heat must transfer through the base compared to a location further away. More material means less resistance for heat to flow, but this also increases mass. Since there is less heat being transferred through the cross section further from the source of heat, there does not need to be as much material as there is at the base, and this taper leads to a more efficient radiator. Furthermore, if anisotropic materials (those with different properties in different directions) or insulative layers such as adhesive are used around or between conductive layers, then having a taper allows heat from the centrally located layers to conduct to an exposed surface region that can then radiate heat to the environment.

A clamping bracket holds the layers together near the source of heat. This part allows the heat to flow from the source to the layers using conductive and or convective heat transfer with minimal thermal contact losses. This bracket can achieve this clamping effect with the use of fasteners, adhesive, or by designing it to elastically press the layers together with arms that want to bend inwards.

As layers can be flexible, particularly at distances far from the source of heat, a structural supporting bracket can be used with this design to maintain rigidity and keep layers together. In the design shown in the drawings, this rectangular profile bracket is attached to the bracket clamping the layers together, however, structural supports could come from other locations, and use a different profile to reduce bending, such as a hollow tube, I-beam, or other cross-section or geometry.

In addition to a supporting bracket, another method of affixing or clamping layers together can be used to maintain shape and allow transverse direction heat transfer between different layers. Here, magnetic disks are shown as an example to compress the radiator's layers together, however, other means of accomplishing this could include grommets, adhesive, or fasteners. The advantages of these additions will become apparent from a study of the detailed description and accompanying drawings.

This new radiator assembly could achieve a theoretical value of heat per unit mass around approximately 610 W/kg as well as heat per unit projected area of around 590 watts per square meter if double sided as shown. This does not include the equipment required to transport the heat to the base of the radiator assembly but does include the mass of a bracket and fluid acting as the source of heat. These values assume a heat source temperature around 300 kelvin, although different temperatures are likely to be used and will vary depending on the application. It is also assumed that this radiator is radiating to the space environment with temperature at absolute zero. It is assumed that for each quadrant of the device, there are ten layers each approximately 10 μm in thickness, with the furthest layer at a distance from the heat source around 225 mm, resulting in a linear taper with a slope of 2250 units changed in distance per change in height. It should be noted that all these parameters are just examples and could be changed depending on the application. The materials used are pyrolytic graphite sheet with thermal conductivity of at least 1300 watts per meter kelvin, and an aluminum clamping bracket with thermal conductivity of around 230 watts per meter per kelvin. This embodiment is 200 millimeters in width; however, this dimension can be longer or shorter depending on the application.

The advantages of this tapered radiator design will become apparent from a study of the following description and accompanying drawings.

BRIEF DESCRIPTION OF THE DRAWINGS

FIG. 3 is an isometric view of a multiple-sided radiator with structural supports FIG. 3A is an isometric view of a support structure FIG. 4 is an isometric view of a multiple-sided radiator with disks compressing the layers together FIG. 4A is a disk used to compress layers together FIG. 4B is a front view of a multiple-sided radiator with disks compressing the layers

DETAILED DESCRIPTION

Figure 1:
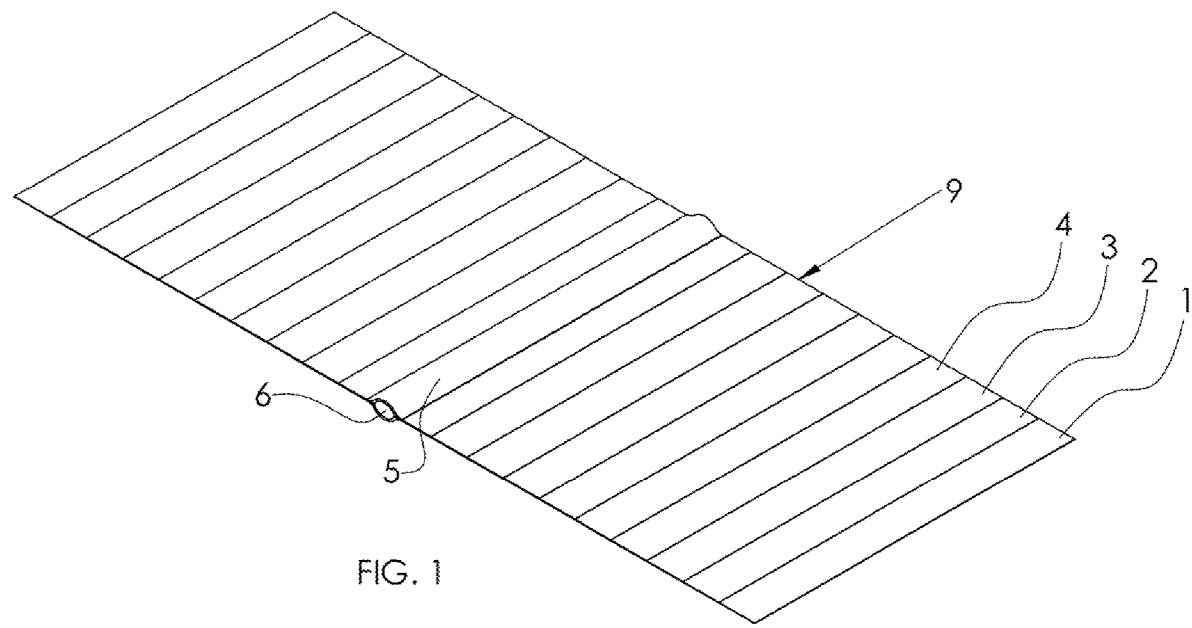
FIG. 1 is an isometric view of a multiple-sided radiator

FIG. 1 shows an isometric view of a multiple-sided tapered radiator assembly, referred to as the first embodiment, or just the radiator, 9. This image shows the tapered layered thermally conductive sheets, referred to as the layers, including the last four, 1, 2, 3, and 4 which are labeled. It also includes a clamping bracket that both holds the layers together, and transfers heat to them from the source of heat, 6. It should be noted that this design assumes radiation occurs from both top and bottom layered surfaces, although some applications would only use one side. If this is the case, one could consider using just the top half of the layers, still tapered, just not symmetric. As has been mentioned previously, other linear, or non-linear curves that the taper follows could also work. Here, the device is shown to be around 200 mm wide, however, since this device is here depicted as a constant cross-section, this dimension could be changed to whatever is necessary for the application. The device does not need to be a constant cross-section, however.

Figure 2:
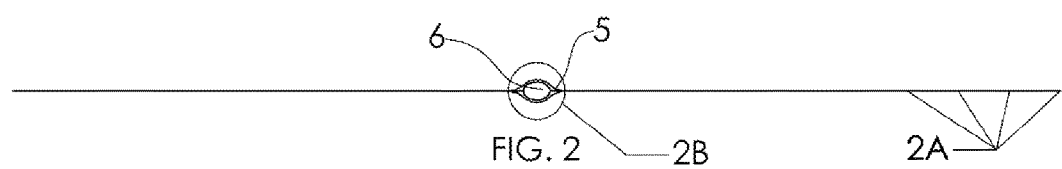
FIG. 2 is a side view of a multiple-sided radiator

FIG. 2 shows a front view of this embodiment. The clamping bracket can be seen in the center section, and the layered sections can be seen on either side. Because the layers of this radiator are very thin and long, a zoomed-in detailed view is required.

Figure 2A:
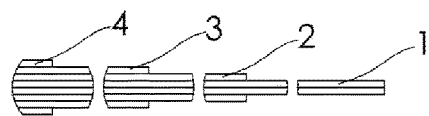
FIG. 2A is a detailed view of the last 4 layers of a single side of the radiator from FIG. 2

FIG. 2A shows how the layers taper, and this view includes break lines in between the lengths of the layers because it would be difficult to show this effect if it were at true scale. I presently contemplate that these layers are 10

μm thick each, made of pyrolytic graphite with in-plane thermal conductivity of 1950 W/(m*K), with 10 layers per quadrant, however, it can have different sizes, and use different materials. The tapering effect reduces mass towards the sections that are further from the heat source, which is important in optimizing for heat per unit mass of any radiator.

Figure 2B:
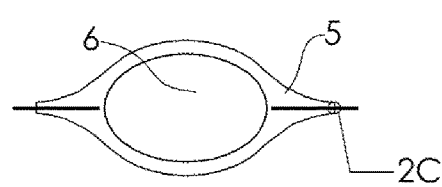
FIG. 2B is a detailed view of a clamping bracket attached to the layers of the radiator from FIG. 2 along with a source of heat

FIG. 2B shows the clamping bracket of part number 5 and shows it in contact with the layers in between it. This contact is important for the function of this device because the heat source, 6, needs to have a pathway to conduct heat through the bracket, and into the layers which spread the heat horizontally. This contact is emphasized in the detailed view, FIG. 2C. This bracket is a dual-purpose device, which supports the layers, but also transfers heat to them as well. I presently contemplate this to be made from aluminum 1050-H14, 22 mm wide, 10 mm tall, in an oval internal cross-section, although other materials, dimensions, and cross-sections could also be used. The source of heat, 6, along with the clamping bracket, 5, together make up the means of delivering heat to the thermally conductive layers.

Figure 2C:
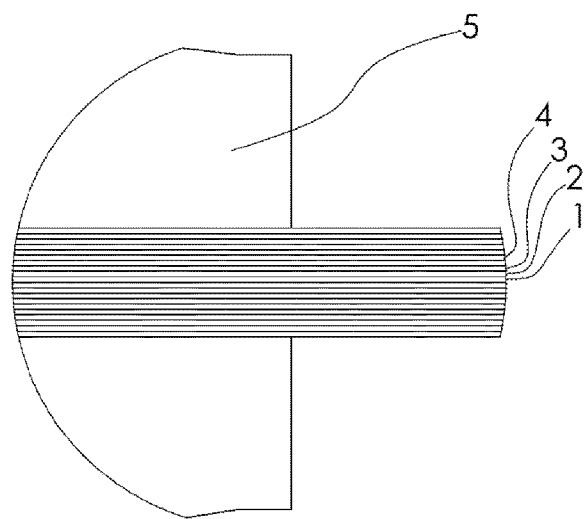
FIG. 2C is a detailed view of the radiator's layers' connection to the clamping bracket from FIG. 2B

FIG. 2C shows a detailed view of the clamping bracket, part 5, which transfers heat from the source to the layers through conductive heat transfer. The layers are all clamped together, and the furthest four layers, parts 1, 2, 3, and 4, of the top right quadrant of the radiator can be seen near the center of this detailed view. To reduce thermal resistance (reducing a drop in temperature) heat transfer requires a larger surface area for materials or geometries that are less conductive, such as the aluminum bracket. In addition, the layers have a much lower thermal conductivity in the out-of-plane directions, around 14 W/(m*K). These factors combined are the reason why the area of thermal contact is much larger than the total combined thickness of the layers.

FIG. 3 shows a second embodiment, one which includes a structural supporting bracket to maintain the rigidity of these thin flexible layers. This radiator assembly is the same as assembly, 9, with just the addition of a structural supporting bracket, part 7. This supporting element could be necessary if these layers are not otherwise supported. It is shown here attached to the clamping bracket; however, this does not need to be the case. Other supports from a spacecraft could be attached to the external surface of these radiators and used to position its layers in place and prevent any motion due to forces or accelerations.

FIG. 3A shows an isometric view of just the structural supporting bracket, 7. Here, it is presently contemplated to be attached to clamp, 5, through some means of adhesion, although other fastening methods are acceptable as well. This supporting member is shown with material at the end connecting two halves, although this is not necessary for the function of maintaining structural rigidity in the layers. This structural bracket could also be directly attached to the layers by using fasteners or adhesive. This support could be made solid or include hollow sections. The material which is presently thought to be an optimal configuration is carbon fiber composite, however, other materials, sizes, geometries, and placements for this supporting member could also be considered.

FIG. 4 shows a third embodiment which includes multiple devices, each part 8, that affixes this embodiment's layers together. This layer-to-layer contact could be accomplished either by using adhesive or using compression forces created externally from the layers. The function of this device is to ensure that layers are not spreading apart, and to enable good thermal contact between layers for higher heat transfer.

FIG. 4A shows an isometric view of a part, 8, that holds the layers together. This device is pictured using magnets on multiple sides to create the compression loads, but this is just one means of performing this task. Other means of compressing layers could include grommets, clamps, or other fasteners. Other sizes, materials, placements, or means of connecting layers together could also be used instead of part 8 which is depicted.

FIG. 4B shows a front view of the third embodiment, indicating that the parts that hold the layers together, 8, are on opposite sides.

Figure 5:
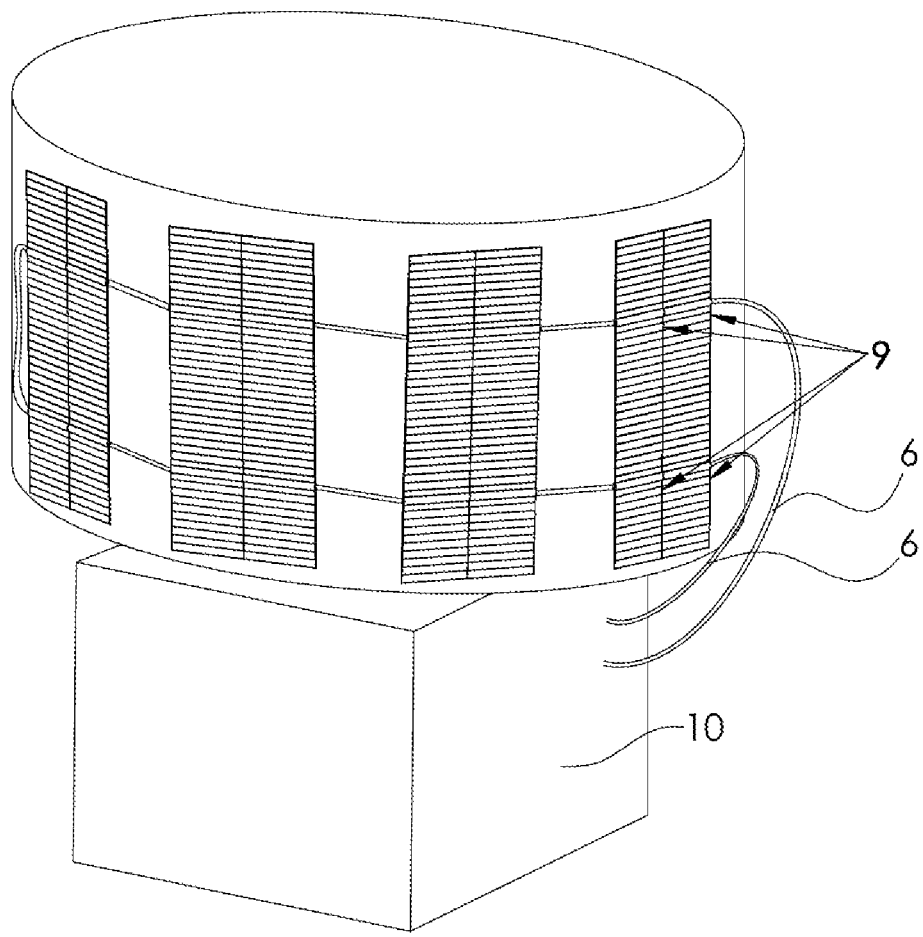
FIG. 5 is an isometric view of a spacecraft with several connected radiator assemblies along with tubes to transport the heat to those radiators

FIG. 5 shows just one example of how to use the first embodiment, assembly 9, on a spacecraft. The radiator assemblies are connected and placed side by side, here in clusters of four. A source of heat, 6, runs through the clusters and transfers heat to the radiating layers. The example spacecraft, 10, has a cylindrical surface which the radiators attach to, however, they could also be deployed from a mechanism, free-floating, or otherwise attached. The source of heat comes from the spacecraft and is then transferred to the radiators through the source of heat, 6. Here, only the front faces are being used for radiation, as these are the faces exposed to the environment. Other uses can include double-sided radiation.

Figure 6:
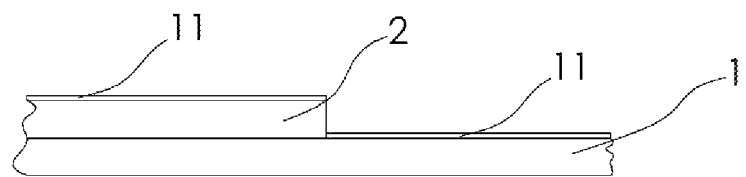
FIG. 6 is a detailed view of tapered radiator layers with a layer or coating to increase the surface's emissivity.

FIG. 6 shows a front detailed view of just two example layers, 1, and 2, tapered, with a heat-emission layer or coating, 11, on the radiating surfaces. This additional layer is used to increase radiation by having an emissivity larger than the conductive layers themselves. This coating, 11, can be adhesive itself, or include a layer underneath it to connect to the conductive layers below.

REFERENCE NUMERALS 1 furthest layer
2 second from furthest layer
3 third from furthest layer
4 fourth from furthest layer
5 clamping bracket
6 source of heat
7 structural supporting bracket
8 part to hold layers together
9 radiator assembly
10 spacecraft
11 heat-emission layer or coating with or without adhesive Operation In operation, one uses these embodiments by providing a source of heat, also known as a means of delivering heat, which transfers this heat to the radiating layers. This means of delivering heat may be accomplished by using heat pipes, pumped fluid loops, or even through the means of conduction of a solid material. A bracket that clamps the layers together can be used to support layers, but also connect them to this means of delivering heat.

The layers need to face a cooler temperature in the surrounding environment for radiative heat transfer to remove heat from the layers. In the presence of an atmosphere, convection could also play a role in transferring heat along with radiation.

To position these radiators, one could add any means of attachment to an assigned fixed location. The use of supporting brackets, walls, straps, cords, adhesives, fasteners, or even using a pressurized tube that maintains tension could be incorporated to keep a radiator in a specified location.

The structural supports that prevent out-of-plane motion of the layers are used by connecting a member that holds the layers to a separate more rigid member, therefore reducing motion when forces are applied.

CONCLUSION, RAMIFICATIONS, AND SCOPE

Accordingly, the reader will see that the tapered and layered radiator embodiments can be used to reject a large amount of heat for minimal mass. Layered sections are held together by structural supports as well as other mechanisms and can withstand forces that may act to displace the layers. A spacecraft which uses this design could save many kilograms of mass over traditional sandwich panel radiator designs. Furthermore, the radiator shown can be connected with many others to reject more heat than when used individually.

Although the description above contains many specificities, these should not be construed as limiting the scope of the embodiments but as merely providing illustrations of some of several embodiments. For example, the structure supporting the radiator layers can come in many shapes or connect to other structures; the source of heat can come from a wall instead of a tube; the layers can be non-symmetric and different sizes, etc.

Thus, the scope of the embodiments should be determined by the appended claims and their legal equivalents, rather than by the examples given.

I claim:

1. A radiator comprising:
at least two thermally conductive layers arranged in a stack of layers;
a heat transfer clamping bracket operably coupled to a first end of the layers of the stack and configured to deliver heat from a heat source to said layers, the heat transfer clamping bracket having a heat source receiving portion configured to thermally couple with a heat source, the heat transfer clamping bracket being configured to clamp said layers together proximal to said heat transfer source; and
one or more supporting brackets coupled at a first end thereof to the heat transfer clamping bracket and arranged along a length of the stack of thermally conductive layers, the one or more structurally supporting brackets supporting the stack of thermally conductive layers in a predetermined orientation, wherein
the stack of layers has a tapered overall shape in cross section due to sequentially shorter lengths of the thermally conductive layers exposing a second end of each layer to a surrounding environment for heat rejection, a total thickness of the stack diminishing with distance away from said heat transfer clamping bracket.

2. The radiator according to claim 1, further including, on at least a portion of a surface of each thermally conductive layer, a heat-emission layer wherein the heat-emission layer has an exposed surface with an emissivity of at least 0.7.

3. The radiator according to claim 2, further comprising an adhesive layer arranged to bond said each thermally conductive layer to said heat-emission layer.

4. The radiator according to claim 1, further comprising one or more layer-securing units configured to mechanically fix each of the thermally conductive layers in place, said layer-securing units being disposed in or on the stack at one or more distances away from the heat transfer clamping bracket.

5. The radiator according to claim 1, further comprising one or more layer-securing units configured to mechanically fix said thermally conductive layers to each other, said one or more layer-securing units being disposed in or on the stack at one or more distances away from said heat transfer unit, wherein each layer-securing unit attaches to the heat transfer clamping bracket that clamps said thermally conductive layers.

6. The radiator according to claim 1, wherein at least a portion of the heat transfer clamping bracket is composed of aluminum.

7. The radiator according to claim 1, wherein the heat transfer clamping bracket is formed at least in part from a resiliently compliant material and positioned to apply force against the stack of thermally conductive layers, the force corresponding to an amount of compliance of the resiliently compliant material against the stack of conductive layers.

8. The radiator according to claim 1, wherein at least one of said thermally conductive layers includes a pyrolytic graphite sheet.

9. The radiator according to claim 1, wherein the radiator includes at least two instances of the stack of layers, each stack instance being thermally coupled to the heat transfer clamping bracket at the first end of the respective stack.

10. The radiator according to claim 9, wherein the at least two stacks of layers and the heat transfer clamping bracket are arranged substantially in a common plane.

11. The radiator according to claim 1, wherein at least one of said thermally conductive layers is composed of aluminum.

12. The radiator according to claim 1, wherein the thermally conductive layers are disposed having a distance less than 400 μm between adjacent thermally conductive layers.

13. The radiator according to claim 1, wherein each structurally supporting bracket includes a first half and a second half, the first half of the structurally supporting bracket being disposed on one side of the stack of thermally conductive layers, and the second half being disposed on an opposite side of the stack of thermally conductive layers.

14. The radiator according to claim 1, wherein the stack of layers includes a number of the thermally conductive layers arranged on respective sides of one or more central layers, in a mutually tapered cross section such that a length of the one or more central layers of the thermally conductive layers is longer, from the first end of the one or more central layers to the second end of the one or more central layers, than a length of adjacent layers, of the thermally conductive layers arranged on respective sides of the one or more central layers.

15. The radiator according to claim 14, wherein the thermally conductive layers arranged on respective sides of the central layer include at least one pair of thermally conductive layers arranged symmetrically about the one or more central layers and having a common length with each other.

* * * * *